(12) United States Patent
Totani et al.

(10) Patent No.: US 11,667,088 B2
(45) Date of Patent: Jun. 6, 2023

(54) WELDING DEVICE AND WELDING METHOD

(71) Applicant: Totani Corporation, Kyoto (JP)

(72) Inventors: Mikio Totani, Kyoto (JP); Tatsuo Odani, Kyoto (JP); Toshinori Ueda, Kyoto (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 17/764,201

(22) PCT Filed: Sep. 15, 2020

(86) PCT No.: PCT/JP2020/034834
§ 371 (c)(1),
(2) Date: Mar. 28, 2022

(87) PCT Pub. No.: WO2021/079651
PCT Pub. Date: Apr. 29, 2021

(65) Prior Publication Data
US 2022/0332057 A1    Oct. 20, 2022

(30) Foreign Application Priority Data

Oct. 21, 2019 (JP) .............................. JP2019-192170

(51) Int. Cl.
*B29C 65/00* (2006.01)
*B29C 65/16* (2006.01)
*B29C 65/78* (2006.01)

(52) U.S. Cl.
CPC .......... *B29C 66/8511* (2013.01); *B29C 65/16* (2013.01); *B29C 65/7891* (2013.01); *B29C 66/814* (2013.01)

(58) Field of Classification Search
CPC ... B29C 66/8511; B29C 66/814; B29C 65/16; B29C 65/7891; B31B 70/644
See application file for complete search history.

(56) References Cited

U.S. PATENT DOCUMENTS

| | | | |
|---|---|---|---|
| 2015/0183176 A1* | 7/2015 | Totani ................ | B29C 65/1687 |
| | | | 493/213 |
| 2018/0093352 A1 | 4/2018 | Katada et al. | |
| 2020/0338836 A1 | 10/2020 | Ikuta et al. | |

FOREIGN PATENT DOCUMENTS

| | | |
|---|---|---|
| JP | 5619268 | 11/2014 |
| JP | 6023293 | 11/2016 |
| WO | 2016163487 | 10/2016 |
| WO | 2019097942 | 5/2019 |

* cited by examiner

*Primary Examiner* — Daniel Mcnally
(74) *Attorney, Agent, or Firm* — JCIPRNET

(57) ABSTRACT

A welding device includes a pair of pressure rollers for pressurizing a web and a strip member, a feed device configured to intermittently or continuously feed the web and the strip member through the pair of pressure rollers, and the laser device configured to irradiate the web or the strip member with a laser beam at a position upstream of the pair of pressure rollers. The welding device may include a movement device configured to move the pair of pressure rollers upstream with respect to the web and the strip member during pause or stop of feed. Alternatively, the feed device may pause or stop the web and the strip member after retracting the web and the strip member by a certain length.

8 Claims, 15 Drawing Sheets

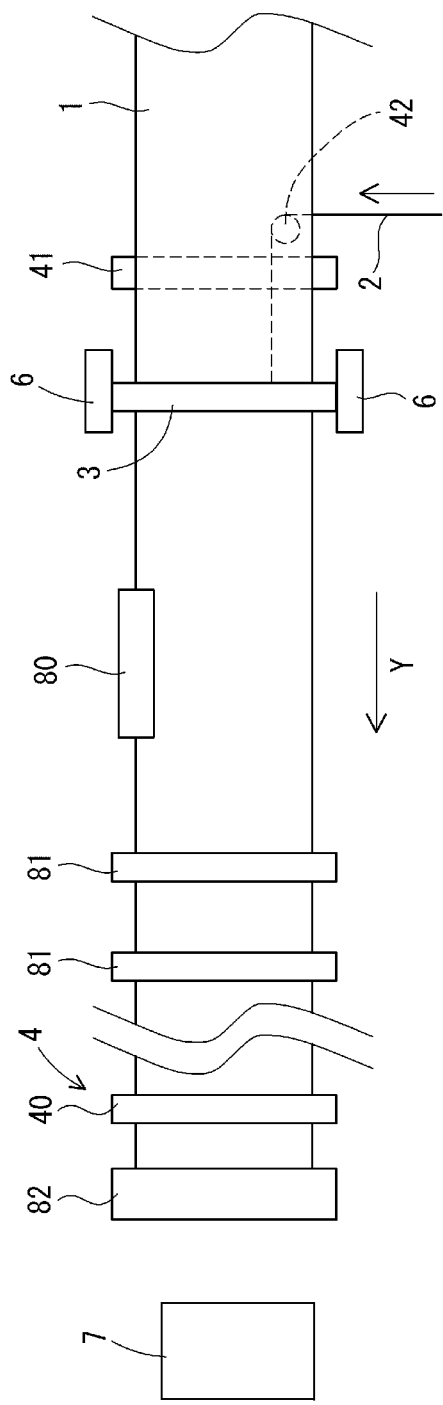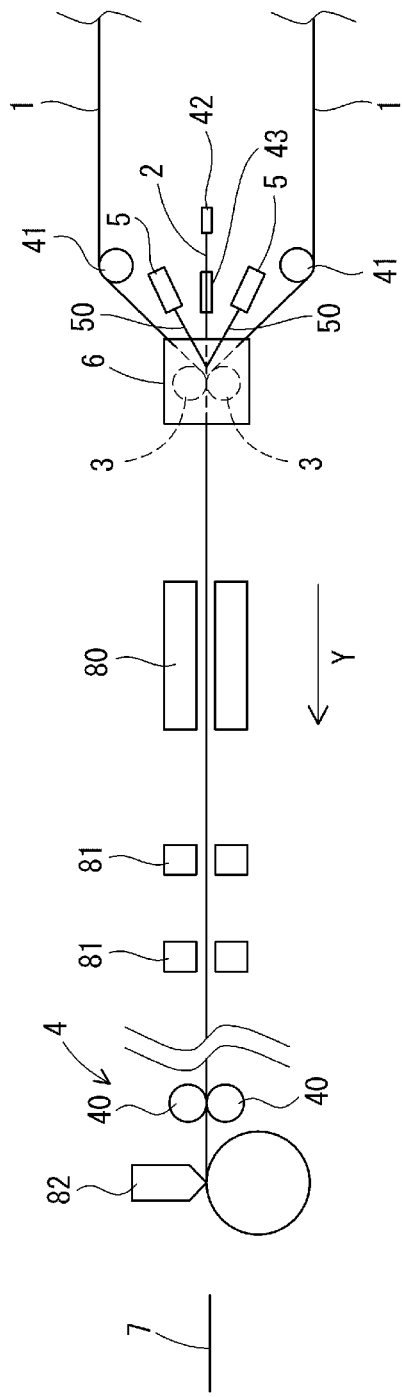

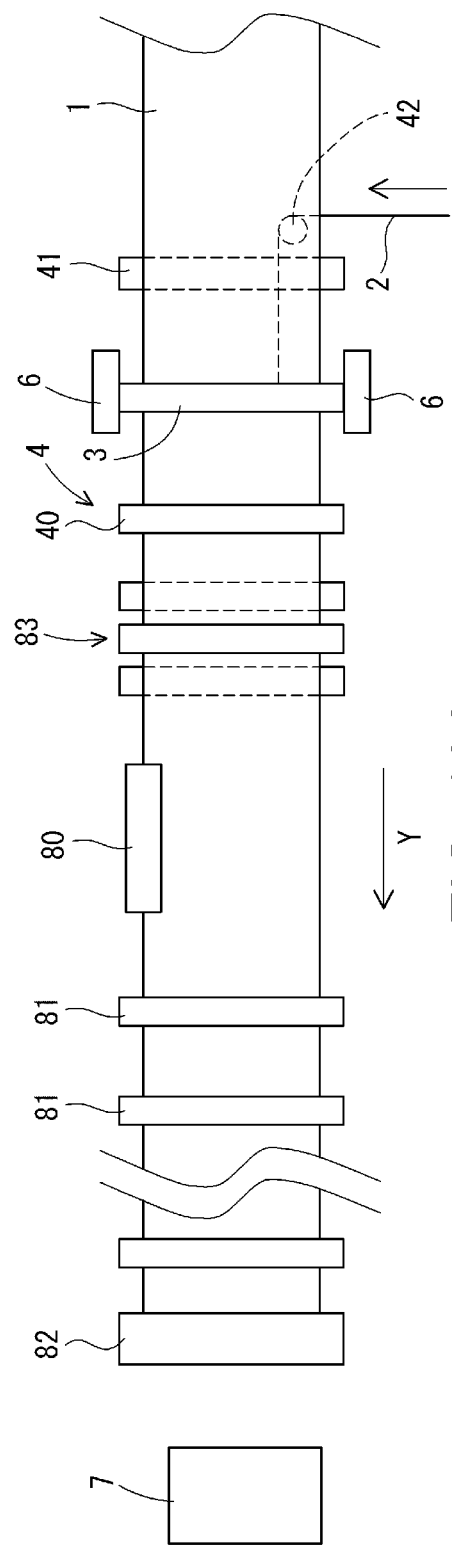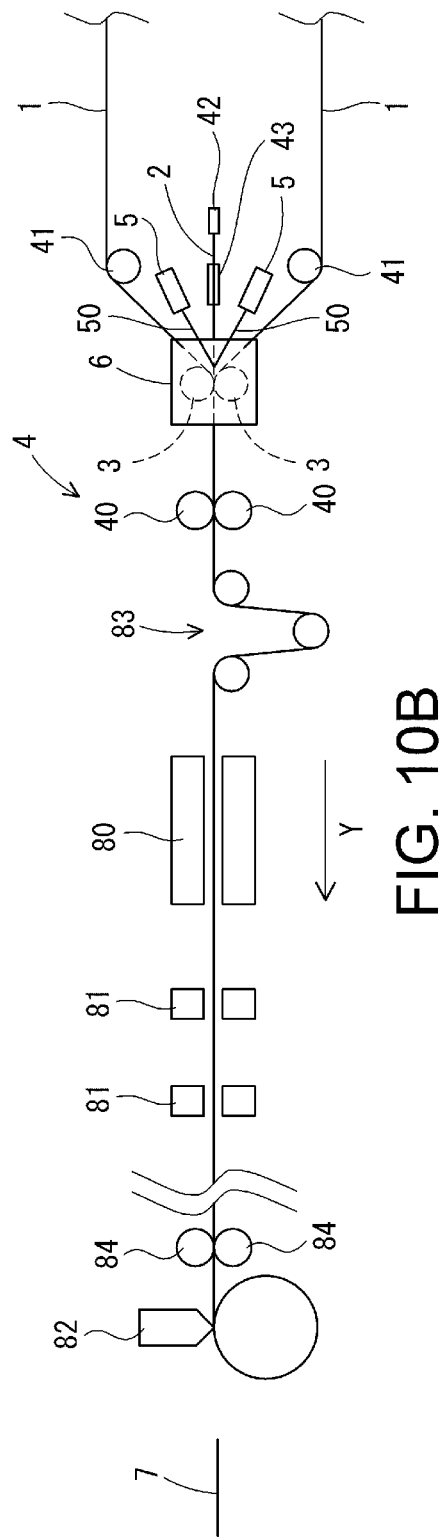

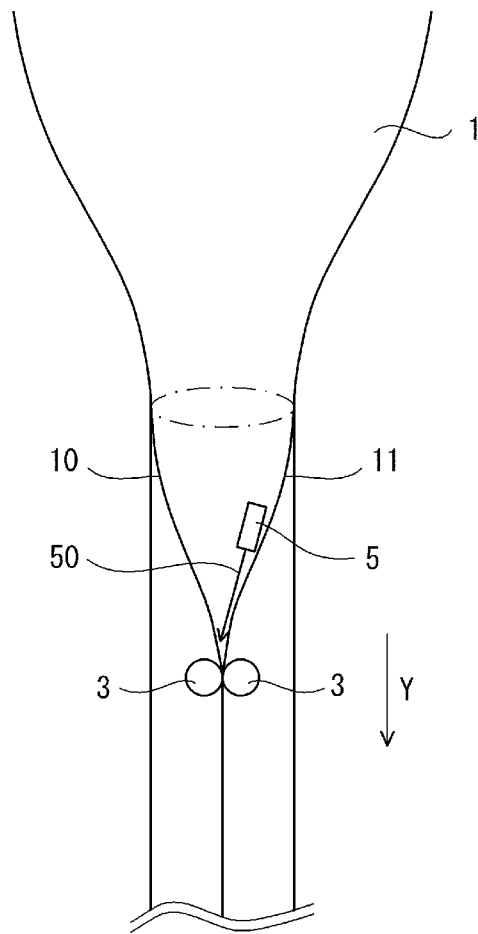
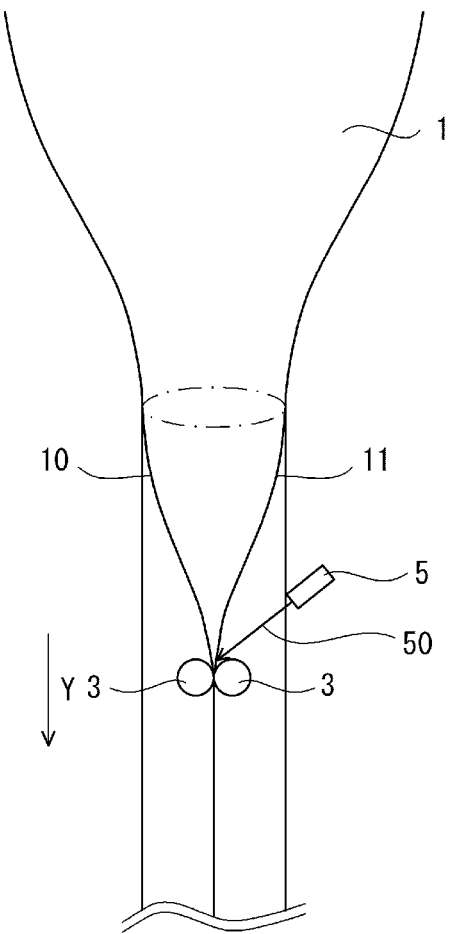
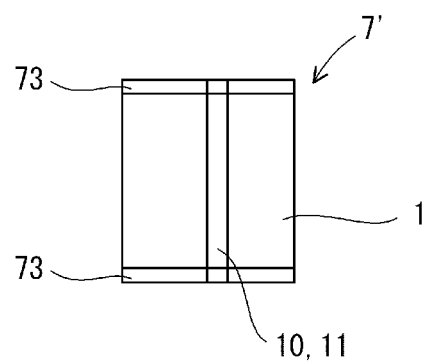
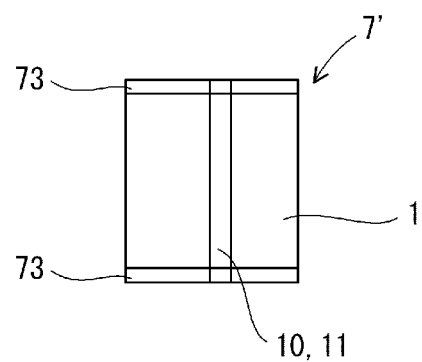
FIG. 15A　　　　　　　　　FIG. 15B

WELDING DEVICE AND WELDING METHOD

CROSS-REFERENCE TO RELATED APPLICATION

This application is a 371 application of an international PCT application serial no. PCT/JP2020/034834, filed on Sep. 15, 2020, which claims the priority benefit of Japan application JP2019-192170, filed on Oct. 21, 2019. The entirety of the above-mentioned patent application is hereby incorporated by reference herein and made a part of this specification.

TECHNICAL FIELD

This disclosure relates to devices and methods for welding a continuous strip member to a web, and in particular to welding with a laser beam and pressurization.

BACKGROUND

Bag making apparatuses for successively making plastic bags from a continuous sheet panel and a continuous zipper are well known as disclosed in Patent documents 1 to 4. The bag making apparatus includes a welding device configured to weld the sheet panel and the zipper to each other.

The welding device in each of Patent documents 1 and 2 includes a pair of pressure rollers opposing each other for pressurizing the sheet panel and the zipper, a feed device configured to intermittently feed the sheet panel and the zipper in their longitudinal direction through the pair of pressure rollers in a state in which they are superposed on each other, and a laser device configured to irradiate the zipper with a laser beam at a position upstream of the pair of pressure rollers.

Irradiating the zipper with a laser beam causes its irradiated part to be heat-melted by the laser beam. The sheet panel and the zipper are then guided to the pair of pressure rollers to be superposed on each other. When the sheet panel and the zipper pass through the pair of pressure rollers, they are pressurized by the pair of pressure rollers and thus welded to each other.

The temperature at the irradiated part is decreasing while this part is being fed from the irradiation position of the laser beam to the pair of pressure rollers. For proper welding, the molten state of the irradiated part should be maintained until the irradiated part reaches the pair of pressure rollers.

The sheet panel and the zipper are intermittently fed. This means that the sheet panel and the zipper are repeatedly fed and paused. During the pause phase of the intermittent feed cycle, the irradiated part which is located in the section from the irradiation position to the pair of pressure rollers cools down to return from the molten state to the non-molten state. When the sheet panel and the zipper are then fed again, the irradiated part is pressed in the non-molten state against the sheet panel by the pair of pressure rollers, and consequently fails to be welded to the sheet panel. In this way, the unwelded part, which was subject to the laser irradiation and the pressurization but failed to be welded, is generated every intermittent feed cycle. The unwelded part can be a cause of leakage in making bags, have an influence on the quality of the bags, and in addition, cause the loss of material.

Since the feed device of the welding device disclosed in each of Patent documents 3 and 4 not intermittently but continuously feeds the sheet panel and the zipper, there is no problem as described above. However, if the welding device stops its operation, the feed device also stops feeding the sheet panel and the zipper. Then, the irradiated part which is located in the section from the irradiation position of the laser beam to the pair of pressure rollers cools down to return to the non-molten state. If the feed device restarts to feed the sheet panel and the zipper in accordance with the restart of the operation of the welding device, this irradiated part passes in the non-molten state through the pair of pressure rollers. Therefore, the unwelded part is generated.

An object of the present disclosure is to provide devices and methods which allow for shortening an unwelded part.

CITATION LIST

Patent Document

Patent document 1: JP6023293B1.
Patent document 2: JP5619268B1.
Patent document 3: WO2019/097942A1.
Patent document 4: WO2016/163487A1.

SUMMARY

According to an aspect of the present disclosure, there is provided a welding device for welding a web and a continuous strip member to each other. The welding device includes: a pair of pressure members opposing each other for pressurizing the web and the continuous strip member; a feed device configured to intermittently feed the web and the continuous strip member in a longitudinal direction of the web and the continuous strip member through the pair of pressure members in a state in which the web and the continuous strip member are superposed on each other; a laser device configured to irradiate the web or the continuous strip member with a laser beam at a position upstream of the pair of pressure members so as to melt the web or the continuous strip member with the laser beam for welding of the web and the continuous strip member; and a movement device configured to move the pair of pressure members upstream with respect to the web and the continuous strip member during a pause phase of an intermittent feed cycle.

The movement device may be configured to, during a pause phase of an intermittent feed cycle, move the pair of pressure members upstream from a reference position and move the pair of pressure members back to the reference position.

The movement device may be configured to move the pair of pressure members upstream during a pause phase of an intermittent feed cycle such that at least one of the pressure members enters a path for the laser beam.

According to another aspect of the present disclosure, a welding device includes: a pair of pressure members opposing each other for pressurizing the web and the continuous strip member; a feed device configured to intermittently feed the web and the continuous strip member in a longitudinal direction of the web and the continuous strip member through the pair of pressure members in a state in which the web and the continuous strip member are superposed on each other; and a laser device configured to irradiate the web or the continuous strip member with a laser beam at a position upstream of the pair of pressure members so as to melt the web or the continuous strip member with the laser beam for welding of the web and the continuous strip member. The feed device is configured to, in an intermittent feed cycle, advance the web and the continuous strip member by a first length, retract the web and the continuous strip member by a second length which is shorter than the first length, and pause the web and the continuous strip member.

The welding device may further include a tension maintenance mechanism arranged upstream of the pair of pressure members and configured to maintain tension of the web.

The second length may be less than or equal to a distance between an irradiation position of the laser beam and a pressure position of the pair of pressure members.

According to yet another aspect of the present disclosure, a welding device includes: a pair of pressure members opposing each other for pressurizing the web and the continuous strip member; a feed device configured to continuously feed the web and the continuous strip member in a longitudinal direction of the web and the continuous strip member through the pair of pressure members in a state in which the web and the continuous strip member are superposed on each other; a laser device configured to irradiate the web or the continuous strip member with a laser beam at a position upstream of the pair of pressure members so as to melt the web or the continuous strip member with the laser beam for welding of the web and the continuous strip member; and a movement device configured to move the pair of pressure members upstream with respect to the web and the continuous strip member in response to the feed device stopping the web and the continuous strip member.

According to yet another aspect of the present disclosure, a welding device includes: a pair of pressure members opposing each other for pressurizing the web and the continuous strip member; a feed device configured to continuously feed the web and the continuous strip member in a longitudinal direction of the web and the continuous strip member through the pair of pressure members in a state in which the web and the continuous strip member are superposed on each other; and a laser device configured to irradiate the web or the continuous strip member with a laser beam at a position upstream of the pair of pressure members so as to melt the web or the continuous strip member with the laser beam for welding of the web and the continuous strip member. The feed device is further configured to stop the web and the continuous strip member after retracting the web and the continuous strip member by a certain length.

According to yet another aspect of the present disclosure, there is provided a welding method for welding a web and a continuous strip member to each other, the welding method including: intermittently feeding the web and the continuous strip member in a longitudinal direction of the web and the continuous strip member through a pair of pressure members in a state in which the web and the continuous strip member are superposed on each other; irradiating the web or the continuous strip member with a laser beam at a position upstream of the pair of pressure members to melt the web or the continuous strip member with the laser beam for welding of the web and the continuous strip member such that the web and the continuous strip member are pressurized by the pair of pressure members to be welded to each other while the web and the continuous strip member pass through the pair of pressure members; and during a pause phase of an intermittent feed cycle, moving the pair of pressure members upstream from a reference position with respect to the web and the continuous strip member such that the web and the continuous strip member are pressurized by the moving pair of pressure members to be welded to each other and moving the pair of pressure members back to the reference position.

According to yet another aspect of the present disclosure, a welding method includes: intermittently feeding the web and the continuous strip member in a longitudinal direction of the web and the continuous strip member through a pair of pressure members in a state in which the web and the continuous strip member are superposed on each other; irradiating the web or the continuous strip member with a laser beam at a position upstream of the pair of pressure members to melt the web or the continuous strip member with the laser beam for welding of the web and the continuous strip member; and in an intermittent feed cycle, advancing the web and the continuous strip member by a first length, retracting the web and the continuous strip member by a second length which is shorter than the first length, and pausing the web and the continuous strip member.

The pair of pressure members may be a pair of pressure rollers. The web may be a continuous sheet panel for bags. The strip member may be a continuous zipper for the bags.

BRIEF DESCRIPTION OF THE DRAWINGS

FIG. 1A is a schematic plan view of a bag making apparatus including an exemplary welding device, and FIG. 1B is a schematic side view of the bag making apparatus in FIG. 1A.

FIG. 10A is a schematic plan view of a bag making apparatus including yet another exemplary welding device, and FIG. 10B is a schematic side view of the bag making apparatus in FIG. 10A.

FIGS. 15A and 15B illustrate other pillow-bag making apparatuses.

DETAILED DESCRIPTION

Welding devices and welding methods according to implementations will be described with reference to the drawings. The same or similar components in each implementation are indicated by the same numerals, and the explanations thereof are omitted.

[First implementation] FIGS. 1A and 1B schematically illustrate a bag making apparatus. A welding device according to the implementation is provided in the bag making apparatus. The welding device is configured to weld a continuous strip member 2 to a web 1 (i.e., a continuous sheet). The strip member 2 has a narrower width than that of the web 1.

Figure 2A:
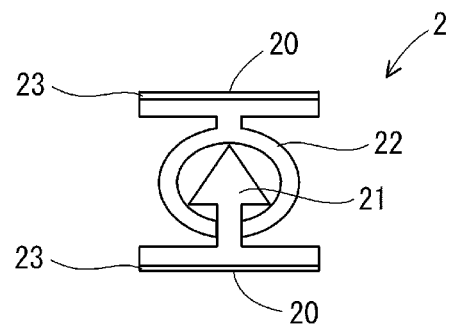
FIG. 2A is a schematic sectional view of an exemplary strip member (zipper)
Figure 2B:
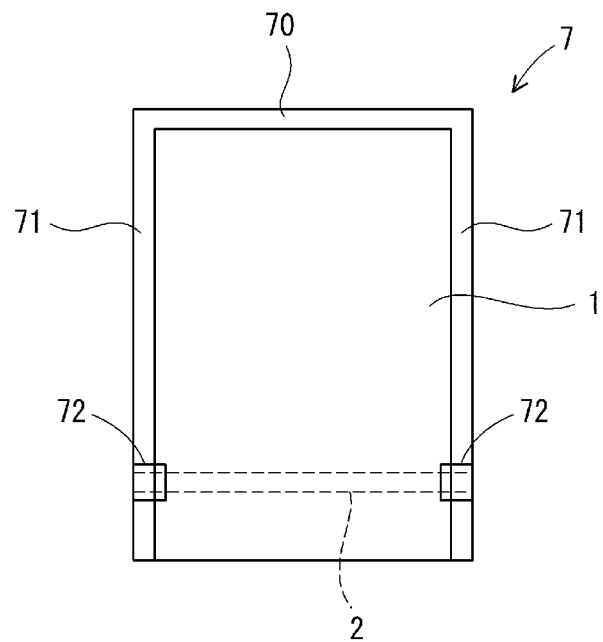
FIG. 2B is a schematic plan view of an exemplary bag.

As illustrated in FIGS. 2A and 2B, the web 1 in this implementation is a continuous plastic film, specifically a continuous sheet panel from which sheet panels of bags 7 will be formed. The strip member 2 in the implementation is made of plastic and is a continuous zipper from which zippers of the bags 7 will be formed. The strip member 2 in the implementation has two surfaces 20 to be welded on the opposite sides thereof. As in Patent document 1, a zipper as the continuous strip member 2 includes a male member 21 and a female member 22 which are detachably fitted to each other. Hereinafter, the strip member 2 (zipper) will be fed with the male member 21 and the female member 22 fitted to each other, and be welded to the webs 1.

As illustrated in FIGS. 1A and 1B, the welding device includes a pair of pressure rollers 3 as a pair of pressure members opposing each other for pressurizing the two webs 1 and the strip member 2. As will be described below, the webs 1 and the strip member 2 are pressurized by the pair of pressure rollers 3 to be welded to each other.

The welding device further includes a feed device 4 configured to intermittently feed the webs 1 and the strip member 2 in their longitudinal direction (their continuous direction) and to superpose them on each other such that they pass through the pair of pressure rollers 3 in a superposed state. Thus, the webs 1 and the strip member 2 are repeatedly fed and paused by the feed device 4. The reference sign Y in Figures designates the feed direction when the webs 1 and the strip member 2 are fed in the superposed state.

The feed device 4 includes at least one pair of drive rollers 40 arranged downstream of the pair of pressure rollers 3 to intermittently feed the webs 1 and the strip member 2. The pair of drive rollers 40 rotates with the webs 1 and the strip member 2 sandwiched therebetween, and thereby intermittently feeds the webs 1 and the strip member 2 through the pair of pressure rollers 3 as well as the pair of drive rollers 40. Only one pair of drive rollers 40 is illustrated in Figures for the purpose of convenience. However, for a large apparatus, a plurality of the pairs of drive rollers 40 are typically provided, and all of the pairs of drive rollers 40 are driven synchronously when intermittently feeding the webs 1 and the strip member 2.

The feed device 4 further includes guide rollers 41 for guiding each of the webs 1 to the pair of pressure rollers 3. Each web 1 is continuously unrolled from a roll thereof in a well-known manner. Alternately, a wide web may be continuously unrolled from a roll thereof, and slit in the longitudinal direction thereof into the two webs 1. Then, feed of the webs 1 is properly converted by a dancer mechanism (not shown) from the continuous feed into the intermittent feed. The guide rollers 41 are arranged downstream of the dancer mechanism. Each web 1 is guided to the pair of pressure rollers 3 via the guide roller 41.

The feed device 4 further includes a guide roller 42 and a guide body 43 (FIG. 1B) for guiding the strip member 2 to the pair of pressure rollers 3. The strip member 2 is unrolled from a roll thereof, guided to a space between the two webs 1 before being superposed, diverted in the direction Y via the guide roller 42, and fed through the guide body 43 to the pair of pressure rollers 3.

Therefore, the webs 1 and the strip member 2 are caused to be superposed on each other at a position right before the pressure position of the pair of pressure rollers 3. At this time, one surface 20 of the strip member 2 comes into contact with one of the webs 1, and the other surface 20 of the strip member 2 comes into contact with the other web 1. The webs 1 and the strip member 2 are then fed through the pair of pressure rollers 3 in the superposed state.

Figure 3:
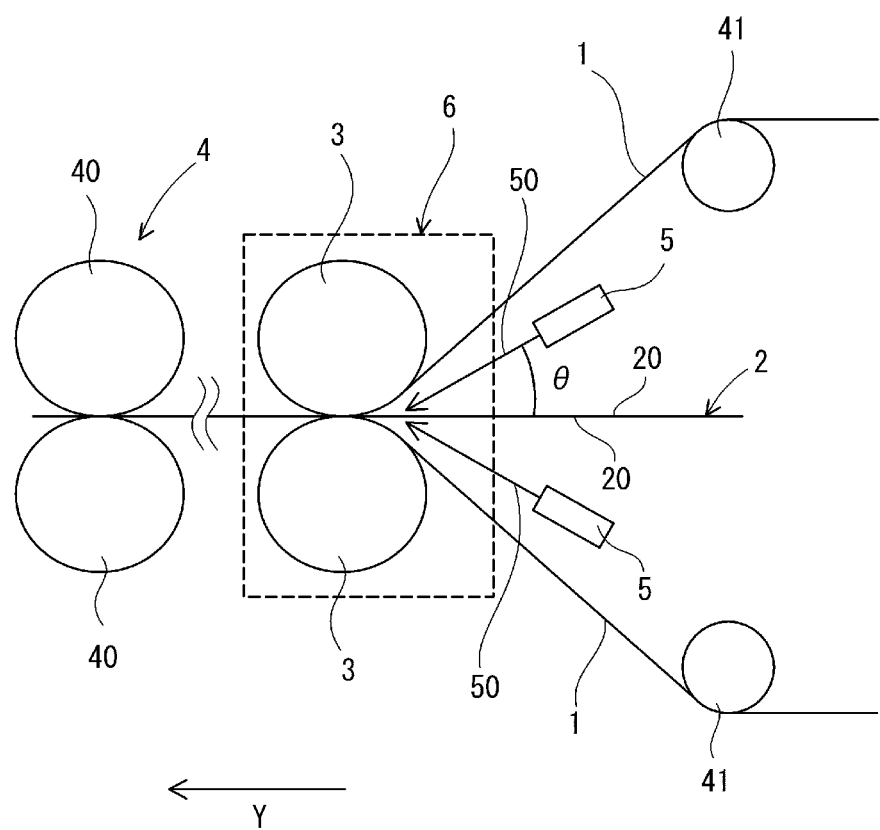
FIG. 3 is a partial side view of the welding device in FIG. 1B.

As illustrated in FIG. 1B and FIG. 3, the welding device further includes two laser devices 5 each configured to irradiate the strip member 2 with a laser beam 50 so as to melt the strip member 2 with the laser beam 50. Each of the laser devices 5 includes a laser source and an optical system which are similar to those in Patent documents 1 and 2. One of the laser devices 5 is arranged to irradiate one surface 20 of the strip member 2 with the laser beam 50, and the other laser device 5 is arranged to irradiate the other surface 20 of the strip member 2 with the laser beam 50. As in Patent documents 1 and 2, each laser device 5 is arranged to irradiate the strip member 2 with the laser beam 50 at the irradiation angle q ($0<q=<90$). As illustrated in FIG. 2A, each surface 20 of the strip member 2 is made of a light absorption layer 23 which absorbs the laser beam 50. This allows the surfaces 20 to absorb the laser beam 50, generate heat and be melted. The wavelength of the laser beam 50 is appropriately selected. For example, this may be visible light or infrared light.

As in Patent document 1, the laser device 5 interlinks the irradiation intensity of the laser beam 50 with the feed speed of the web 1 to maintain uniformity of the strength of the welding when welding with the laser beam 50 during the intermittent feed. It increases the irradiation intensity when the web 1 is fed at a higher speed, correspondingly it decreases the irradiation intensity when the web 1 is fed at a lower speed. In other words, the laser device 5 is configured to radiate the laser beam 50 while controlling the irradiation intensity of the laser beam 50 in accordance with the feed speed.

Figure 4A:
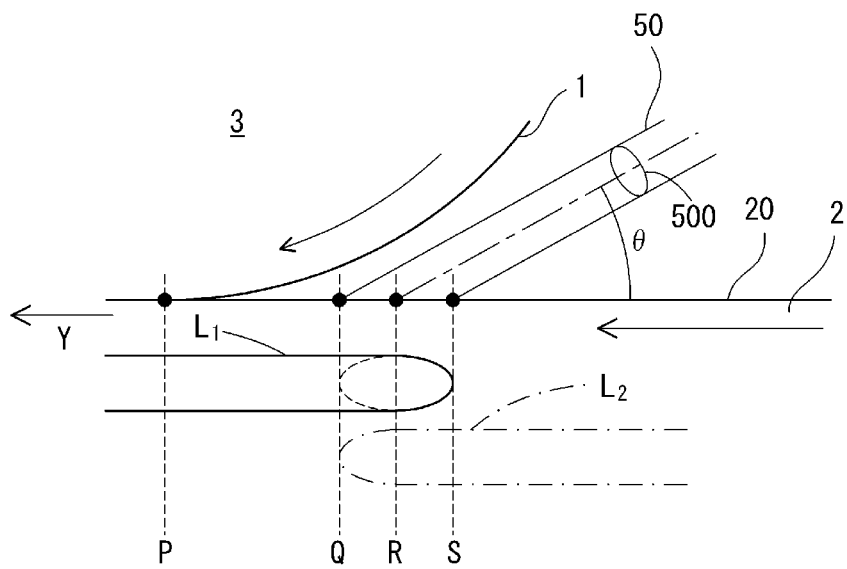
FIG. 4A illustrates a welding method.
Figure 4B:
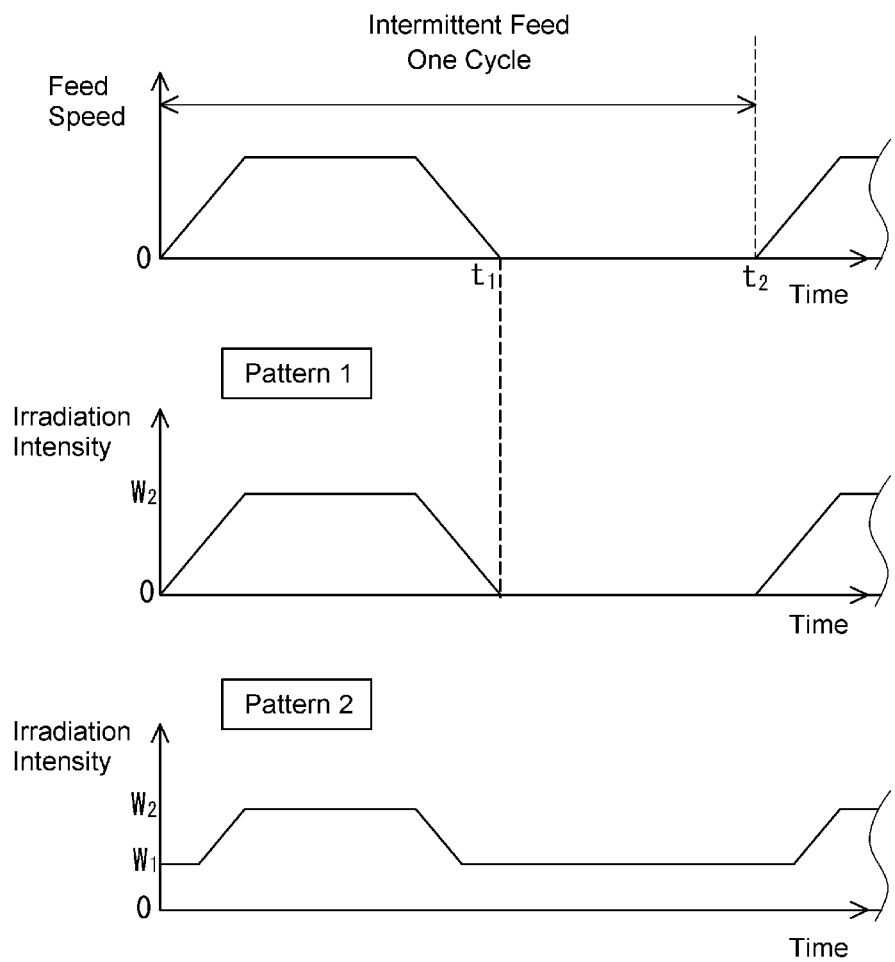
FIG. 4B illustrates relationships between feed speed and irradiation intensity.

The example of this is illustrated in FIG. 4B. In the pattern 1, the irradiation intensity is in complete proportion to the feed speed, which means that the irradiation intensity is zero (i.e., the laser beam 50 is not radiated) when the feed speed is zero. In contrast, in the pattern 2, the irradiation intensity is in proportion to the feed speed but is controlled such that it is not less than the minimum predetermined value $W_1$ ($0<W_1<W_2$; $W_2$ is the irradiation intensity value when the feed speed is maximum). This means that the laser beam 50 is radiated continuously while the web 1 is not only being fed but also being paused. The laser device 5 sets the output to zero for pattern 1, whereas it does not set the output to zero for pattern 2. Since the laser device 5 is generally subjected to the highest load when outputting from the zero-output state, the pattern 2, which has lesser burden on the laser device 5 than the pattern 1, is preferable.

As illustrated in FIG. 3, the laser beams 50 are radiated onto the surfaces 20 (the light absorption layers 23), so that the surfaces 20 are heat-melted by the laser beams 50, respectively. The webs 1 and the strip member 2 are caused to be superposed on each other such that the surfaces 20 in the molten state come into contact with the webs 1, respectively, and then pass through the pair of pressure rollers 3. The webs 1 and the strip member 2 are pressurized by the pair of pressure rollers 3 while they pass through the pair of pressure rollers 3. This causes one of the webs 1 and one of the surfaces 20 to be welded to each other, and also the other web 1 and the other surface 20 to be welded to each other. It is well-known that the surface 20 needs to be pressed in a molten state against the web 1 by the pair of pressure rollers 3 in order for welding to be guaranteed.

The welding device further includes a movement device 6 configured to move the pair of pressure rollers 3 downstream (in the feed direction Y) and upstream (in the opposite direction thereof). For example, the movement device 6 includes: support members which rotatably support the opposite ends of the rotation shafts of the respective pressure rollers 3; guides which support the support members to guide them in the feed direction Y and the opposite direction thereof, respectively; and an actuator which moves the support members along the guides. Operation of the actuator allows the support members and the pair of pressure rollers 3 to move together along the guides upstream and downstream. The movement device 6 is not limited to this example.

As will be described below, the movement device 6 moves the pair of presser rollers 3 in synchronization with the intermittent feed performed by the feed device 4. FIG. 4A illustrates the irradiation with the laser beam 50. FIG. 4A only illustrates one of the webs 1 and one of the pressure rollers 3. FIG. 4A separately illustrates the end part of the line $L_1$ irradiated with the laser beam 50 and the start part of line $L_2$ to be irradiated with the laser beam 50 for the purpose of convenience. As illustrated in FIG. 4A, the laser beam 50 having a spot-like cross section 500 is radiated at the irradiation angle θ onto the surface 20 of the strip member 2 through the vicinity of the part of the web 1 that is engaged with the pressure roller 3. Thereafter, the irradiated surface 20 reaches the predetermined reference position P and is pressed against the web 1 by the pair of pressure rollers 3 at the reference position P.

Figure 5A:
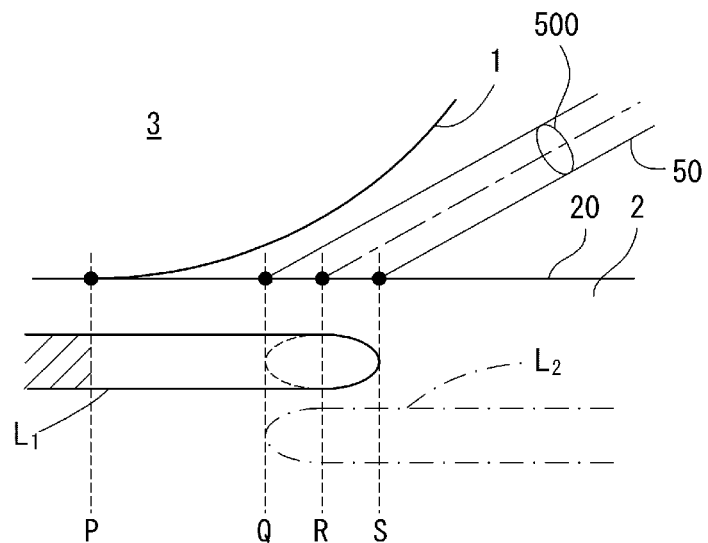
FIGS. 5A and 5B illustrate a welding method.

FIG. 5A illustrates the situation when the time is $t_1$ (see FIG. 4B), i.e., the moment the web(s) 1 and the strip member 2 have just started to be paused. The hatched part in line $L_1$ indicates the welded part. The surface 20 in the section P-S is melted as it has been irradiated with the laser beam 50, but is not welded to the web 1.

Figure 5B:
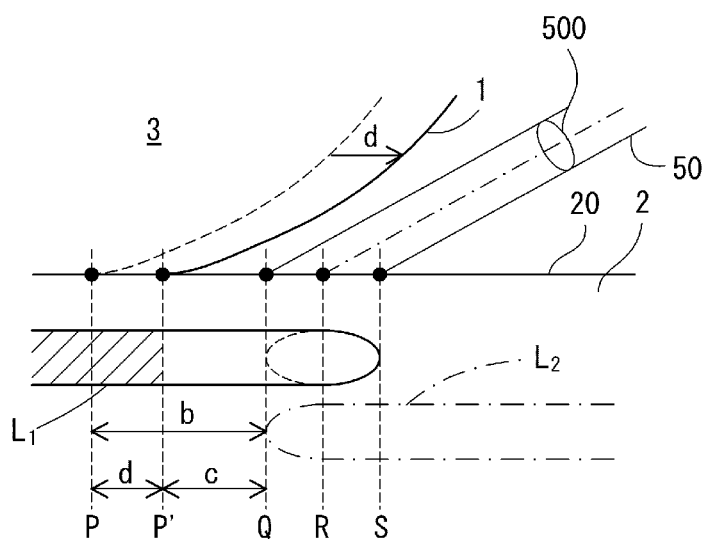

As illustrated in FIG. 5B, when the web 1 and the strip member 2 are paused, the pair of pressure rollers 3 is moved by the movement device 6 upstream (right direction on Figure) from the reference position P to the position P' with respect to the web 1 and the strip member 2 by the distance d. While the pair of pressure rollers 3 is moving in the section P-P', it presses the web 1 against the surface 20 which is in the molten state, thereby pressurizing the web 1 and the strip member 2 to weld them to each other in the section P-P' by the distance d. The movement device 6 then moves the pair of pressure rollers 3 back to the reference position P while the web 1 and the strip member 2 are being paused (by the time $t_2$ in FIG. 4B).

Then, at time $t_2$, the feed device 4 starts to feed the web 1 and the strip member 2. The laser beam 50 is radiated onto the surface 20 in its irradiation position (the section Q-S), so that the part of the surface 20 in the section Q-S is in the molten state. In contrast, the part of the surface 20 in the section P'-Q has already returned from the molten state to the not-molten state. Consequently, while this part of the surface 20 is passing through the pair of pressure rollers 3, it is pressurized by the pair of pressure rollers 3 but fails to be welded to the web 1. In other words, the unwelded area with length c, which is an area where the web(s) 1 and the strip member 2 are completely not welded to each other, is generated. The unwelded part, which is not welded although was subject to the laser radiation and the pressurization, has a length corresponding to the distance of the section P'-R (the part of the surface 20 in the section Q-R is partially welded and not partially welded due to the spot shape of the cross section 500 of the laser beam 50). The downstream part with the length c in the unwelded part is the unwelded area defined as described above.

In this way, the movement device 6, during the pause phase of the intermittent feed cycle, moves the pair of pressure rollers 3 upstream from the reference position P by the distance d and moves it back to the reference position P. This causes the web 1 and the strip member 2 to be pressurized by the moving pair of pressure rollers 3, so that they are welded to each other by the distance d. The upstream movement of the pair of pressure rollers 3 must take place before the surface 20 returns from the molten state to the non-molten state. Therefore, the movement device 6 preferably starts to move the pair of pressure rollers 3 upstream immediately after the beginning of the pause of the feed. The pair of pressure rollers 3 is moved by the movement device 6 as described above during every intermittent feed cycle.

Since the welding device disclosed in Patent document 1 does not include the above movement device 6, the unwelded area with the length b (FIG. 5B) is generated during every intermittent feed cycle. That is, the welding device and the welding method in the implementation allow for shortening the unwelded part by the movement distance d (=b−c) of the pair of pressure rollers 3.

Figure 6A:
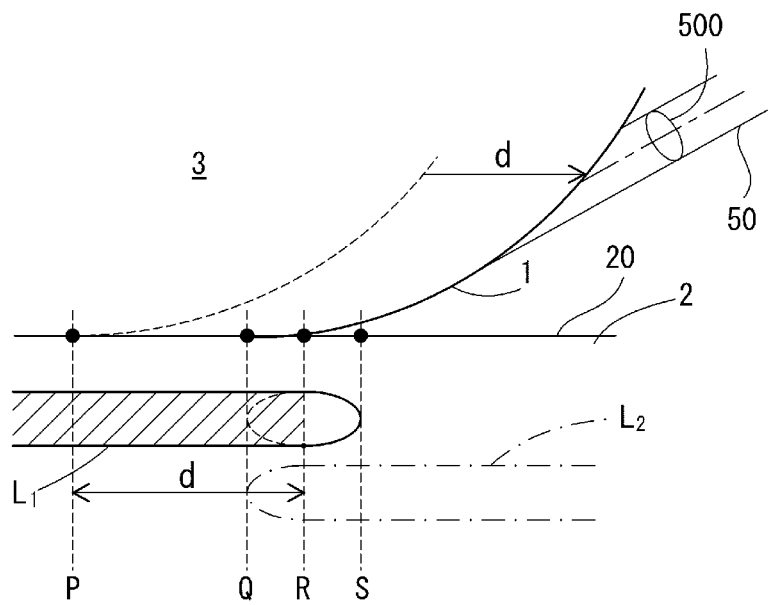
FIGS. 6A and 6B illustrate a welding method.

In the case where the laser device 5 keeps radiating the laser beam 50, for example, according to the pattern 2 of the profile of the irradiation density as illustrated in FIG. 4B, the pair of pressure rollers 3 may be moved by the movement device 6 such that each pressure roller 3 enters the path for the laser beam 50 as illustrated in FIG. 6A. The pressure roller 3 prevents the surface 20 from being irradiated with the laser beam 50 during the pause phase of the intermittent feed cycle. In other words, the surface 20 in the section Q-S is prevented from being kept irradiated with the laser beam 50 during the pause phase of the intermittent feed cycle to become a super-molten state. Thus, at least a part of the pressure roller 30 which pressurizes the web 1 and the strip member 2 may be made of the material which reflects the laser beam 50. For example, the pair of pressure rollers 3 may be moved from the reference position P to the position R. This results in welding the web(s) 1 and the strip member 2 to each other in the section P-R, since the surface 20 in the section P-S is in the molten state. Alternatively, the pair of pressure rollers 3 may be moved from the reference position P to the position S, so that the web(s) 1 and the strip member 2 are welded to each other in the section P-S.

As illustrated in FIG. 6A, the engaged part of the web 1 with the pressure roller 3 is irradiated with the laser beam 50. However, its irradiation position is not the focus of the laser beam, and its energy is also weak. Since the web 1 in this implementation is transparent to the laser beam 50 (the web 1 has no light absorption layer), the web 1 is not damaged by the laser beam 50.

Figure 6B:
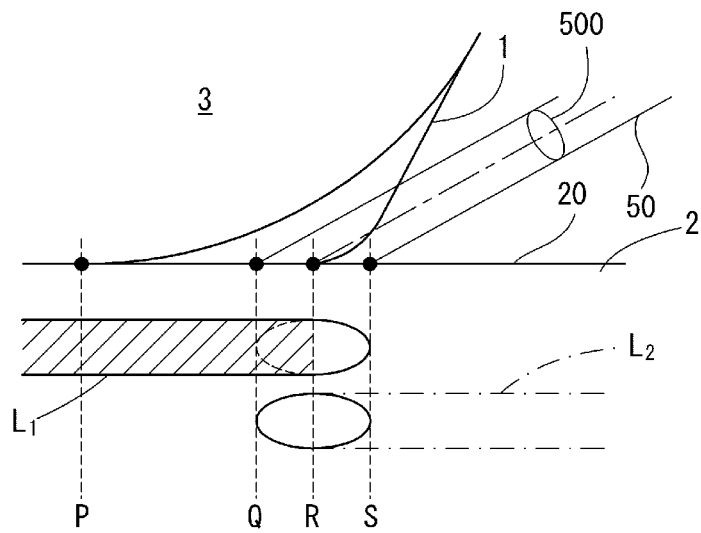

As illustrated in FIG. 6B, just before the beginning of the feed of the web 1 and the strip member 2 (just before $t_2$), the pair of pressure rollers 3 is moved back to the reference position P by the movement device 6. At this time, a part of the web 1 still remains entering the path for the laser beam 50. However, since the laser beam 50 passes through the web 1 as described above, it is radiated onto the surface 20 of the strip member 2, and thereby heat-melts the surface 20. Setting a larger movement distance d allows for welding with almost no unwelded area/part or with no unwelded area/part. The movement distance d is sufficient if it is at most the distance from the reference position P to the position S (the upstream end of the irradiation position).

In the implementation, the pressurizing force required for welding is sufficient if it is about 2N to 3N. A large pair of pressure rollers is not required. For example, the pair of pressure rollers 3 is preferably made of lightweight material such as carbon. Selecting such material allows for easy movement of the pair of pressure rollers 3 with respect to the web(s) 1 and the strip member 2.

The irradiation angle θ is determined as appropriate in the way as disclosed in each of Patent documents. The irradiation angle θ is preferably 90° or close to 90° from the viewpoint of improvement of the irradiation intensity (i.e., prevention of blurry of the focus). On the other hand, the larger the irradiation angle θ is, the further the irradiation position is away from the pair of pressure rollers 3, resulting in the longer unwelded part. Therefore, the irradiation angle θ is, for example, 10° to 80°, in particular 15° to 60°. This is also the same for the following implementations.

The feed device 4, the laser devices 5 and the movement device 6 are operated in conjunction with one another by a control device (comprising a controller, etc.) not shown in Figures.

The welding device is incorporated into the bag making apparatus as described above. As illustrated in FIG. 1A and FIG. 1B, the bag making apparatus further includes a seal device 80, a seal device 81 and a cutting device 82. After the welding, the two sheet panels (webs) 1 are sealed to each other along the side thereof by the seal device 80, so that the sealed part 70 (FIG. 2B) is formed. Also, the sheet panels 1 are sealed to each other in the width direction thereof by the seal device 81, so that the sealed part 71 (FIG. 2B) is formed. These sealings may be in the form of heat-sealing or ultrasonic-sealing. The sheet panels 1 and the zipper (the strip member) 2 are cut in the width direction thereof by the cutting device 82, and thereby the bag 7 is shaped. The cutting may be in the form of shear or fusing. The bags 7 in the implementation are plastic bags.

The bag making apparatus may be a multi-line bag making type, which means that two or more bags 7 are shaped every time the cutting device 82 cuts the sheet panels 1 and the zipper 2. The bag making apparatus may partially seal the panel sheets (webs) 1 and the zipper (strip member) 2 to crush the zipper 2, thereby forming the crushed parts 72 (FIG. 2B) at the opposite ends of the zipper 2 of the bag 7. The crushed parts 72 are similar to those disclosed in Patent document 4 and ensure the sealability of the bag 7 at the ends of the zipper 2. The bag making apparatus preferably forms the crushed parts 72 such that the aforementioned unwelded area/part is included in the crushed part 72. This can reduce the loss of material. Instead of the example in FIG. 2B, the crushed part 72 may be completely included in the sealed part 71 if the unwelded part is short. The unwelded part can be a cause of leakage in making bags, have an influence on the quality of the bags, and in addition, cause the loss of material. Therefore, the welding device is especially advantageous when it is incorporated into a bag making apparatus.

Figure 7A:
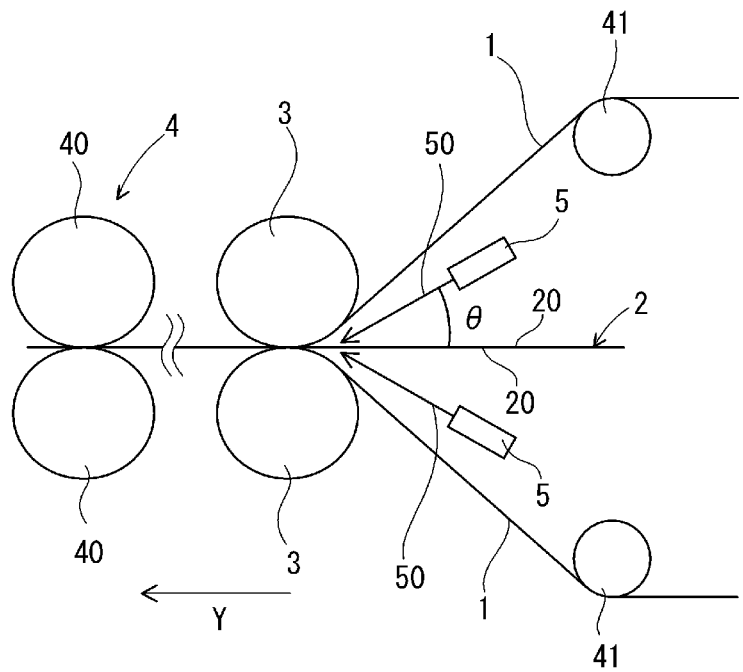
FIG. 7A is a partial side view of another exemplary welding device.
Figure 7B:
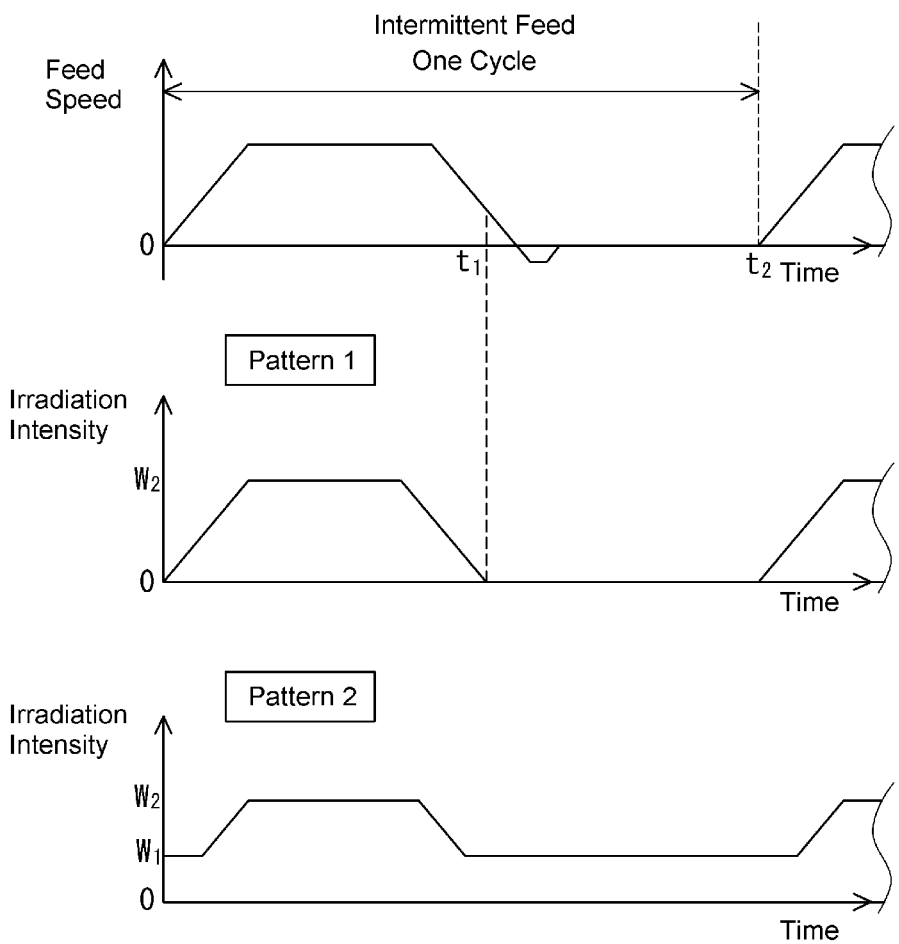
FIG. 7B illustrates relationships between feed speed and irradiation intensity.

[Second implementation] As illustrated in FIG. 7A, the welding device in this implementation does not include the movement device 6 (FIG. 3). The pair of drive rollers 40 of the feed device 4 is configured to be rotatable in the forward and backward directions. FIG. 7B illustrates the relationships between the feed speed and the irradiation intensity in this implementation. As illustrated in the feed speed profile in FIG. 7B, in one intermittent feed cycle, the feed device 4 rotates the pair of drive rollers 40 forward to advance (feed) the webs 1 and the strip member 2 in the feed direction Y by the first length, rotates the pair of drive rollers 40 backward to retract (return) the webs 1 and the strip member 2 by the second length which is shorter than the first length, and then halts the pair of drive rollers 40 to pause the webs 1 and the strip member 2. The feed device 4 intermittently feeds the webs 1 and the strip member 2 in this manner every cycle.

Thus, with "p" as the net pitch of the intermittent feed, "$f_1$" as the first length, and "$f_2$" as the second length, $p=f_1-f_2$ ($f_1>f_2$) is completed.

The example of the operation of the welding device and the welding method when the laser device 5 changes the irradiation intensity according to the pattern 1 of the profile in FIG. 7B will be described below.

Figure 8A:
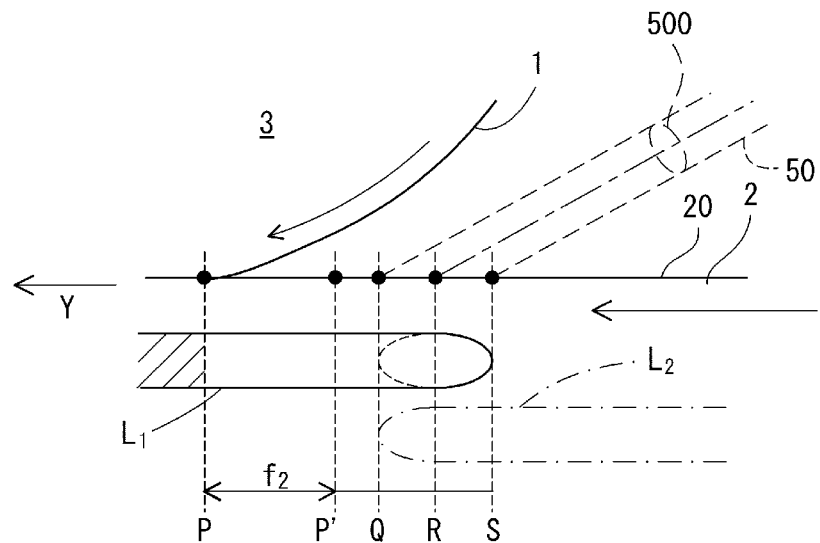
FIGS. 8A and 8B illustrate another welding method.

FIG. 8A illustrates the situation when the time is $t_1$ (FIG. 7B), i.e., the moment the irradiation of the laser beam 50 has just been stopped. At this time, the web(s) 1 and the strip member 2 have already been advanced in the direction Y by the net pitch p, and thereby welded to each other by the net pitch p. The surface 20 in the section P-S has already been irradiated with the laser beam 50, and is therefore in the molten state.

Then, the feed device 4 further rotates the pair of drive rollers 40 in the forward direction without halting the pair of drive rollers 40 to further advance the web 1 and the strip member 2 in the direction Y by the second length $f_2$. This causes the part of the surface 20 in the section P-P' in FIG. 8A to be fed to the pair of pressure rollers 3, and to be pressed against the web 1 by the pair of pressure rollers 3. Consequently, the web 1 and the strip member 2 are additionally welded to each other by the pair of the pressure rollers 3 by the length $f_2$.

Then, the feed device 4 reversely rotates the pair of drive rollers 40 to retract the web 1 and the strip member 2 by the length $f_2$, and halts the pair of drive rollers 40 to pause the web 1 and the strip member 2. Thereby, this additionally welded part is moved back to the section P-P' (FIG. 8B).

Then, at time $t_2$, the next intermittent feed cycle begins.

As can be seen from the above, this implementation can shorten the unwelded part by the retraction length $f_2$ (second length). It is also possible to reduce the unwelded area/part to substantially zero depending on setting of the length $f_2$. The length $f_2$ is sufficient if it is less than or equal to the section P-S (the distance between the pressure position of the pair of pressure rollers 3 and the irradiation position (more specifically, the position of its upstream end) of the laser beam 50).

Figure 8B:
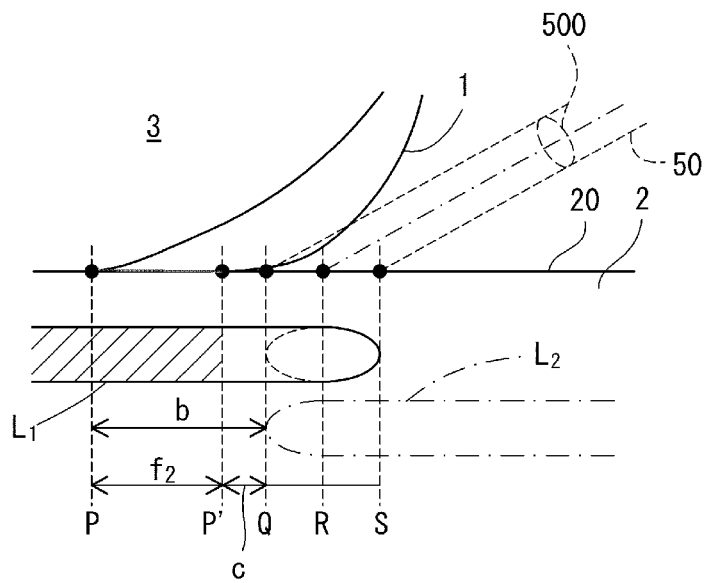

As illustrated in FIG. 8B, a part of the web 1 may enter the path for the laser beam 50 depending on the length $f_2$. As described above, the web 1 is not damaged by the laser beam 50 and does not prevent the surface 20 of the strip member 2 from being irradiated with the laser beam 50.

As described above, the pressurizing force of the pressure rollers 3 may be as small as about 2N to 3N. It is therefore possible to retract the web 1 and the strip member 2 without any problem.

Figure 9:
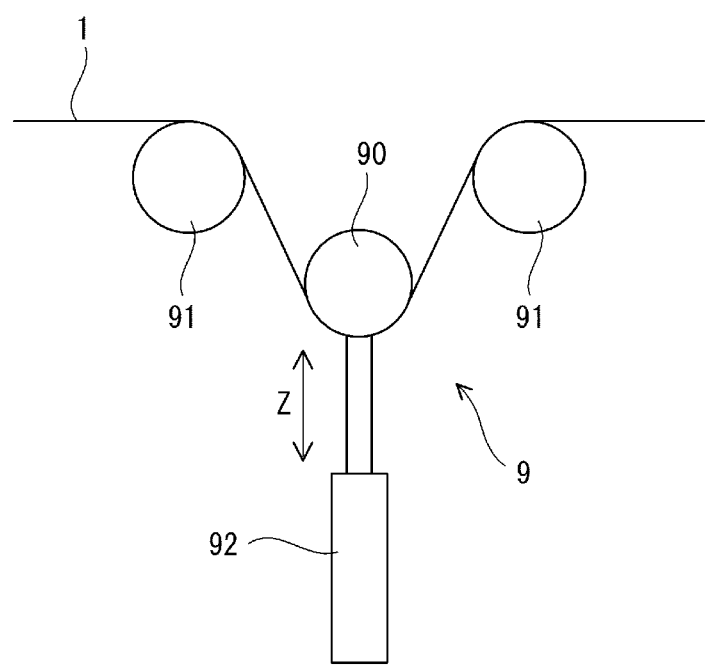
FIG. 9 illustrates a tension maintenance mechanism.

As illustrated in FIG. 9, the welding device in this implementation may include a tension maintenance mechanism 9 (hereinafter simply referred to as "maintenance mechanism"). The maintenance mechanism 9 may be provided for each of the webs 1. The maintenance mechanism 9 is arranged upstream of the pair of pressure rollers 3 (FIG. 7A), more specifically upstream of the guide roller 41 (see FIG. 1A and FIG. 1B) and downstream of the dancer mechanism. The maintenance mechanism 9 is configured to maintain the tension of the web 1. The maintenance mechanism 9 is of a well-known type. For example, the maintenance mechanism 9 includes an application roller 90 for applying tension, two guide rollers 91 located upstream and downstream of the application roller 90, an actuator 92 for moving the application roller 90 in the direction Z, and a sensor (not shown) for detecting the position of the application roller 90. The maintenance mechanism 9 operates the actuator 92 based on the detection by the sensor to adjust the position of the application roller 90 such that the tension is maintained constant. A maintenance mechanism 9 may also be provided for the strip member 2, arranged upstream of the irradiation position of the laser beam 50, and configured to maintain the tension of the strip member 2. The maintenance mechanism(s) 9 absorbs the change of the tension of the web 1/the strip member 2 when the feed device 4 intermittently feeds the web(s) 1 and the strip member 2 according to the feed speed profile in FIG. 7B.

In the previous implementation, the laser device 5 intermittently radiates the laser beam 50 according to the pattern 1 of the irradiation intensity profile in FIG. 7B, but may continuously radiates the laser beam 50. Thus, the laser device 5 may radiate the laser beam 50, for example, according to the pattern 2 of the irradiation intensity profile in in FIG. 7B. This case also allows for shortening the unwelded part.

The feed device 4 and the laser devices 5 in this implantation are also controlled by the control device such that they operate in synchronization with each other.

[Third implementation] FIG. 10A and FIG. 10B illustrate a bag making apparatus including a welding device in this implementation. In this implementation, the pair of drive rollers 40 of the feed device 4 of the welding device continuously rotates to not intermittently but continuously feed the webs 1 and the strip member 2 in their longitudinal direction Y. The bag making apparatus further includes another pair of drive rollers 84 which is disposed downstream of the pair of drive rollers 40 to intermittently feed the webs 1 and the strip member 2 in their longitudinal direction Y. In this implementation, the dancer mechanism 83 is therefore disposed downstream of the pair of drive rollers 40 and upstream of the pair of the drive rollers 84 to appropriately convert the continuous feed into the intermittent feed.

The feed device 4 continuously feeds the webs 1 and the strip member 2 while maintaining their feed speed constant. The strip member 2 is (its surfaces 20 are) melted by the laser beams 50 at a position upstream of the pair of pressure rollers 3. The webs 1 and the strip member 2 are then caused to be superposed on each other and to be pressurized by the pair of pressure rollers 3 so as to be welded to each other. This is same as in Patent documents 3 and 4.

Figure 11A:
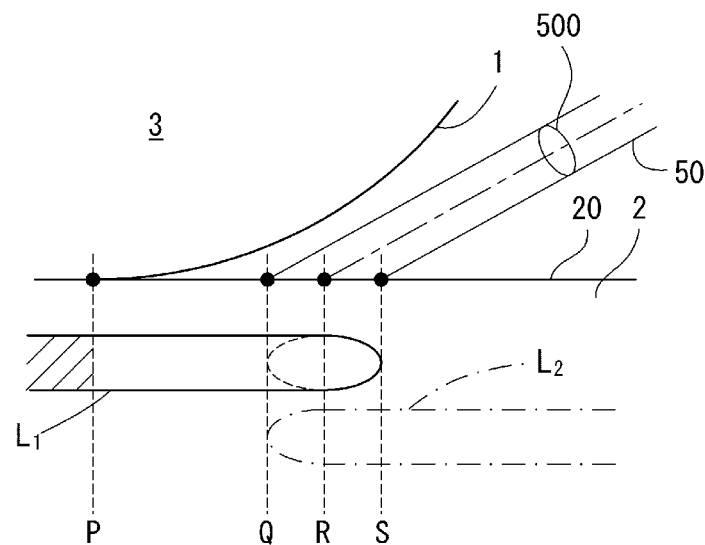
FIGS. 11A and 11B illustrate yet another welding method.
Figure 11B:
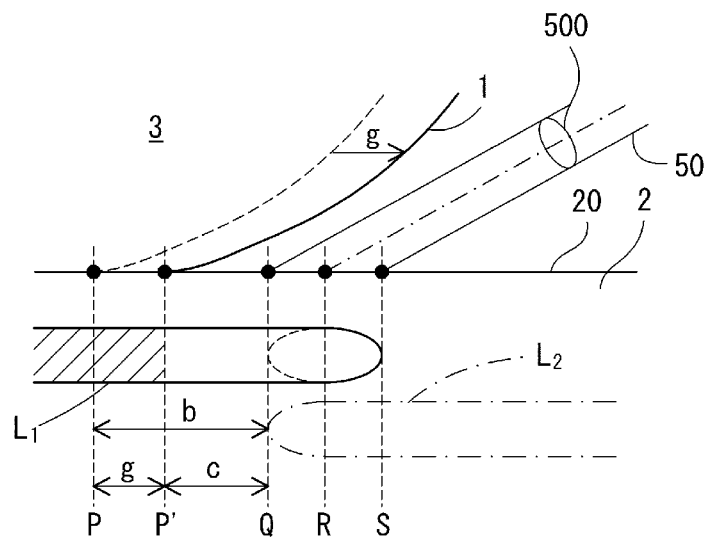

The welding device in the implementation includes the movement device 6 as in the first implementation. If the feed device 4 that is continuously feeding the webs 1 and the strip member 2 in the direction Y, receives the input indicating the stop of the feed, it halts the pair of drive rollers 40 to stop the webs 1 and the strip member 2. As illustrated in FIGS. 11A and 11B, in response to the feed device 4 stopping the web(s) 1 and the strip member 2, the movement device 6 moves the pair of pressure rollers 3 upstream from the reference portion P to the position P' by the distance g with respect to the web 1 and the strip member 2, and then moves the pair of pressure rollers 3 back to the reference position P. This causes the web 1 and the strip member 2 to be welded to each other in the section P-P' by the moving pair of pressure rollers 3 by the distance g.

Thereafter, if the feed device 4 receives the input indicating the start of the feed, it restarts to feed the web(s) 1 and the strip member 2. The laser device 5 irradiates the surface 20 in the section Q-S with the laser beam 50. The part of the surface 20 in the section P'-Q was in the molten state due to the previous irradiation with the laser beam 50 but has already cooled down and returned to the non-molten state at the restart of the feed. Due to this, the part of the surface 20 in the section P'-Q fails to be welded in restarting the feed.

As a result, the unwelded area with the length c is generated. This length c is shorter than the length b of the unwelded area which is generated by the conventional device and method, by the movement length g (c=b−g). Therefore, this implementation also allows for shortening the unwelded part. As in the first implementation, setting the longer movement length g allows for the shorter length of the unwelded area/part, and also can make the length of the unwelded area/part substantially zero.

Figure 12:
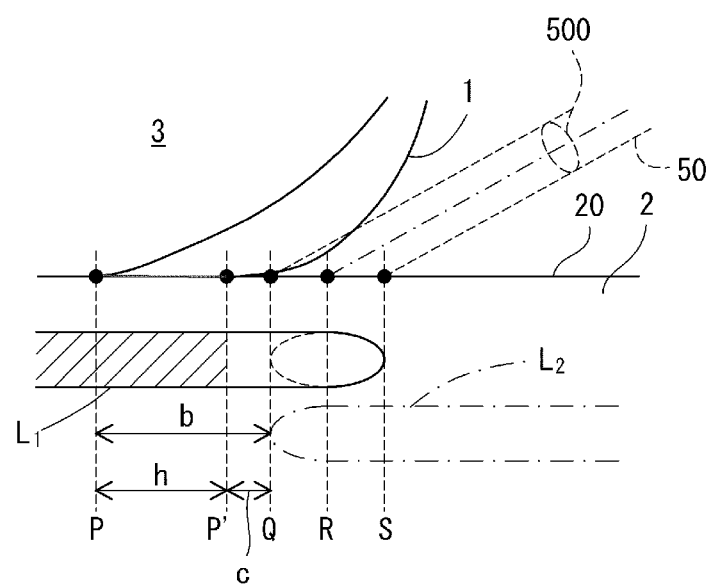
FIG. 12 illustrates yet another welding method.

[Fourth implementation] The welding device in this implementation does not include the movement device 6. The feed device 4 continuously feeds the webs 1 and the strip member 2 in their longitudinal direction. If the feed device 4 receives the input indicating the stop of the feed, it stops the webs 1 and the strip member 2. Specifically, after receiving the input, the feed device 4 retracts the webs 1 and the strip member 2 by the length h and then stops them. More specifically, the feed device 4 switches the pair of drive rollers 40 from forward rotation to backward rotation to retract the webs 1 and the strip member 2 by the length h, and then halts the pair of drive rollers 40 to stop the webs 1 and the strip member 2. As illustrated in FIG. 12, this causes the already welded part of the web(s) 1 and the strip member 2 to be retracted upstream from the pair of the pressure rollers 3 by the length h in the process of stopping the web 1 and the strip member 2. As a result, the welded part is located in the section P-P'.

Then, if the feed device 4 restarts to feed the webs 1 and the strip member 2 in response to receiving the input indicating the start of the feed, the unwelded area with length c is generated as in the third implementation. The length c of this unwelded area is shorter than the length b of the conventional unwelded area by the length h (c=b−h). In this way, this implementation also allows for shortening the unwelded part. As in the second implementation, setting the longer retraction length h allows for the shorter length of the unwelded area/part and also can make the length of the unwelded area/part substantially zero.

Although the preferred implementations of the present invention have been described above, the present invention is not limited to the implementations.

The strip member 2 is irradiated with the laser beam 50 in each of the implementations. Alternatively, the web 1 may have a light absorption layer, and be irradiated with the laser beam 50 so as to weld the web 1 and the strip member 2 to each other.

Figure 13A:
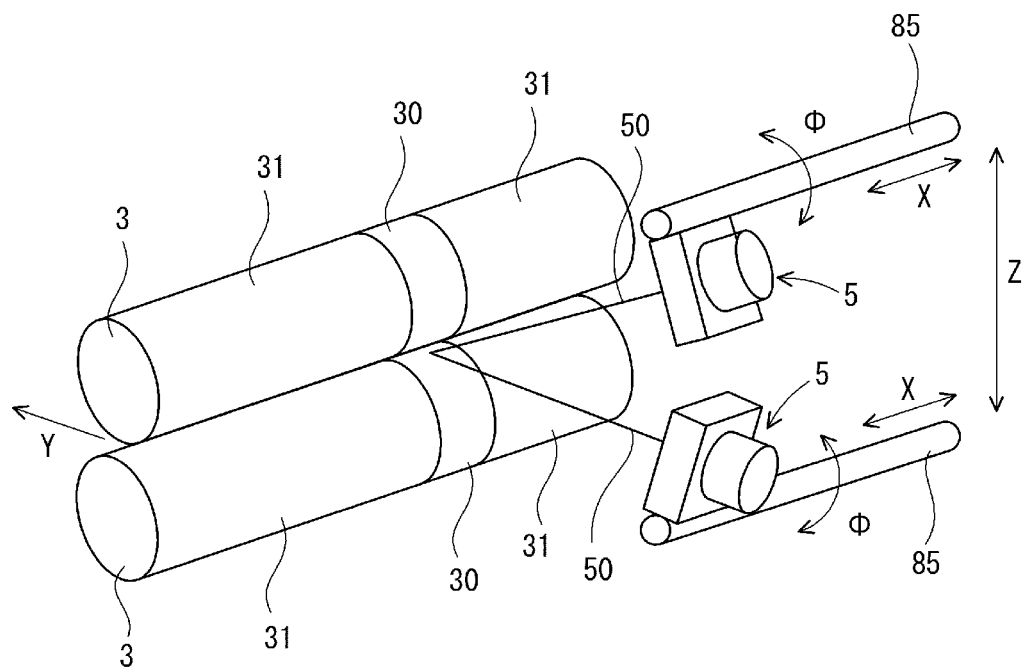
FIG. 13A illustrates a configuration for moving a laser device.

As illustrated in FIG. 13A, each laser device 5 in the respective implementations may be fixed to a base shaft 85 which may be supported by a stage (not shown). The stage may be configured to be movable together with the base shaft 85 in the feed direction Y and its opposite direction with respect to the pair of pressure rollers 3. The base shaft 85 may be supported by the stage to be movable in width direction X of the web 1 with respect to the pair of pressure rollers 3. The base shaft 85 may also be supported by the stage to be movable with respect to the pair of pressure rollers 3 in the direction Z which is perpendicular to the directions X and Y. The base shaft 85 may be supported by the stage to be rotatable around its axis (direction $\Phi$). These allow for free adjustment of the position and orientation of the laser device 5, and thus of the irradiation position and irradiation angle $\theta$ (see FIG. 3, etc.) of the laser beam 50.

There are several factors that should be adjusted in order to irradiate the strip member 2 with the laser beam 50. It is preferable that the factors that a user has to adjust are minimized. Therefore, it is preferable to provide a user with the welding device as a product in which the directions Y, Z, Φ (and thus the irradiation angle θ and the irradiation distance) have been adjusted and fixed in advance. This is because a user only has to adjust the irradiation position in the width direction X of the web 1 for welding. This is user-friendly.

The laser device 5 may have a function to radiate a laser beam 50 of visible light with low output. A user can easily adjust and check the irradiation position in advance using such a laser beam 50 as an indicator before welding.

Figure 13B:
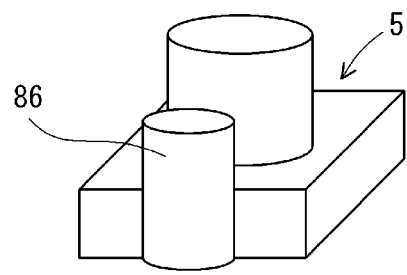
FIG. 13B illustrates a camera provided on a laser device.

As illustrated in FIG. 13B, a camera 86 may be attached to the laser device 5 such that the irradiation position of the laser beam 50 is within its imaging range. A display may indicate the image acquired by the camera 86 on the real time basis. A user can check the irradiation of the laser beam 50 at a position away from there on the real time basis.

As illustrated in FIG. 13A, each of the pressure rollers 3 includes a part 30 for pressuring the web(s) 1 and the strip member 2, and parts 31 adjacent to the part 30. The pressure roller 3 is generally made of carbon, and in this case, the part 30 may be thicker than the parts 31. Alternatively, only the part 30 is made of the material (such as metal) with higher stiffens than carbon. The part 30 made of carbon has a problem that it is bent when pressurizing so that its cross section is deformed into an elliptical shape. The above configuration solves this problem.

Since the carbon absorbs the laser beam 50, the surface of the part of the pressure roller 3 where the laser beam 50 passes by may have a color which reflects the laser beam 50. Such color may include, for example, white or silver. For example, a foil made of material such as aluminum which reflects the laser beam 50 may be pasted or wound on the main body of the pair of pressure rollers 3. The web 1 which is transparent to the laser beam 50, has a possibility that the carbon of the pressure roller 3 absorbs the laser beam 50 to generate heat, resulting in heating the web 1. The above configuration solves this problem.

Although the welding devices in the respective implementations are incorporated into the bag making apparatus in FIG. 1A and FIG. 1B or FIG. 10A and FIG. 10B, they may be incorporated into other types of bag making apparatuses. For example, the welding devices may be incorporated into a pillow-bag making apparatus in FIG. 14A.

Figures 14A, 14B:
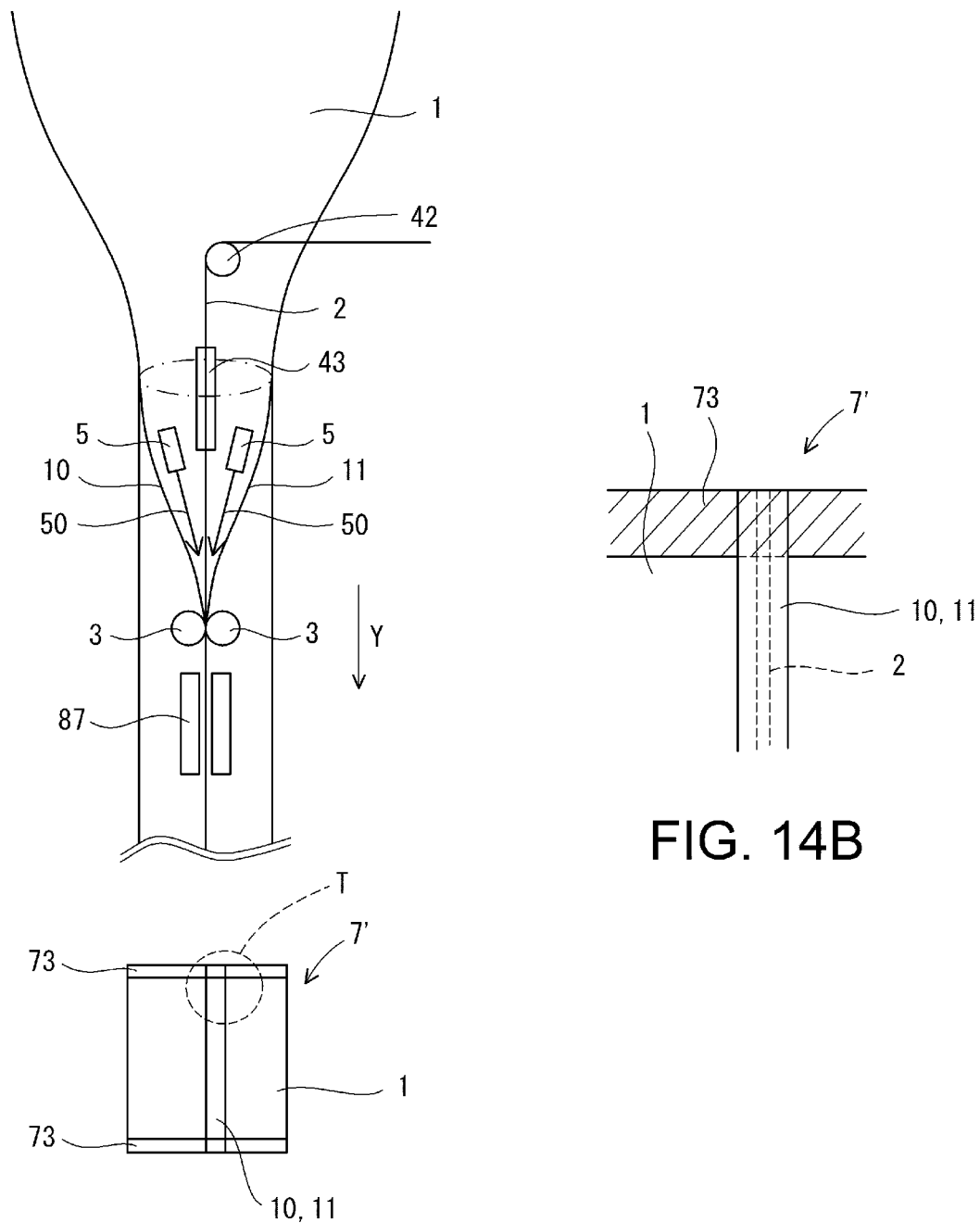
FIG. 14A schematically illustrates a pillow-bag making apparatus including a welding device.
FIG. 14B is an enlarged view of an area T in FIG. 14A for partially illustrating a bag.

In the pillow-bag making apparatus illustrated in FIG. 14A, as a continuous sheet panel 1 (web) is intermittently or continuously fed in the longitudinal direction Y thereof, the sheet panel 1 is guided by a well-known sheet panel guide mechanism (not shown) to be folded into a cylindrical shape such that one side part 10 thereof and the other side part 11 thereof face each other. The side parts 10 and 11 are then guided by the sheet panel guide mechanism to the pair of pressure rollers 3. The zipper 2 (strip member) in FIG. 2A is also guided by the guide roller 42 and the guide body 43 to be interposed between the side parts 10 and 11 and to pass though the pair of pressure rollers 3. This causes the side parts 10 and 11 and the zipper 2 to be superposed on each other and to be fed through the pair of pressure rollers 3 in a superposed state. The two laser devices 5 are arranged to irradiate both surfaces 20 (FIG. 2A) of the zipper 2 with the laser beams 50 at a position upstream of the pair of pressure rollers 3.

Therefore, the side part 10 of the sheet panel 1 and one surface 20 of the zipper 2 are caused to be welded to each other by the pair of pressure rollers 3, and at the same time, the side part 11 of the sheet panel 1 and the other surface 20 of the zipper 2 are caused to be welded to each other by the pair of pressure rollers 3.

Thereafter, the side parts 10 and 11 may be sealed to each other by the seal device 87 in the longitudinal direction thereof along a section which is closer to the edge than the zipper 2. Although not illustrated, contents are then filled in the sheet panel 1. The sheet panel 1 is then sealed in the width direction thereof, so that the sealed part 73 is formed. The sheet panel 1 and the zipper 2 are then cut in the width direction thereof. Thereby, the plastic bag 7' illustrated in FIGS. 14A and 14B is shaped. In the case where the aforementioned unwelded part is generated, it is preferably included in the sealed part 73.

An exemplary pillow-bag making apparatus illustrated in FIG. 15A or FIG. 15B, makes plastic bags 7' having no zipper. In this implementation, a surface of the side part 10 facing the other side part 11 is made of the light absorption layer. One laser device 5 irradiates this surface with the laser beam 50 to melt this surface. The side parts 10 and 11 are pressurized by the pair of the pressure rollers 3 to be welded (sealed) to each other. This implementation requires only one laser device 5 and can dispense with the downstream seal device 87 (FIG. 14A). Therefore, the bag making apparatus can be made smaller and simpler as a whole.

The laser beam 50 may be radiated to the side part 10 from the inside of the sheet panel 1 as illustrated in FIG. 15A. In the case where the side part 11 is transparent to the laser beam 50, the laser beam 50 may be radiated to the side part 10 through the side part 11 as illustrated in FIG. 15B. For this, the side part 11 is, for example, made of material which is highly transparent to the laser beam 50, and printed on using ink with high transparency.

Instead of the plastic film, the web 1 may include, for example, a base made of paper and a film or resin material partially or entirely laminated to the base. The web 1 may be made of any one or more materials as long as it at least partially has a surface weldable to the strip member 2.

Instead of the zipper which includes the male member 21 and the female member 22 fitted to each other, the strip member 2 may be, for example, a male member of a zipper, a female member of a zipper, a male member of a hook-and-loop fastener, a female member of a hook-and-loop fastener, a hook-and-loop fastener (which includes a male member and a female member engaged with each other), an adhesive tape, a seal tape, a tape-like reinforcing member, a tape-like decorative member, a tape-like header of a bag, and so on. The strip member 2 may be made of any one or more materials, as long as it at least partially has a surface weldable to the web 1.

The pair of pressure members 3 may have other configurations than the pair of pressure rollers.

The welding device may be incorporated into other apparatuses than the bag making apparatus.

What is claimed is:

1. A welding device for welding a web and a continuous strip member to each other, the welding device comprising:
   a pair of pressure members opposing each other for pressurizing the web and the continuous strip member;
   a feed device configured to intermittently or continuously feed the web and the continuous strip member in a longitudinal direction of the web and the continuous strip member through the pair of pressure members in a state in which the web and the continuous strip member are superposed on each other;
   a laser device configured to irradiate the web or the continuous strip member with a laser beam at a position upstream of the pair of pressure members so as to melt the web or the continuous strip member with the laser beam for welding of the web and the continuous strip member; and a movement device configured to move the pair of pressure members upstream with respect to the web and the continuous strip member during pause or stop of feed of the web and the continuous strip member so as to weld the web and the continuous strip member to each other.

2. The welding device of claim 1, wherein the feed device is configured to intermittently feed the web and the continuous strip member, and wherein the movement device is configured to, during a pause phase of an intermittent feed cycle, move the pair of pressure members upstream from a reference position and move the pair of pressure members back to the reference position.

3. The welding device of claim 2, wherein the movement device is configured to move the pair of pressure members upstream during a pause phase of an intermittent feed cycle such that at least one of the pressure members enters a path for the laser beam.

4. The welding device of claim 1, wherein the pair of pressure members is a pair of pressure rollers.

5. A welding device for welding a web and a continuous strip member to each other, the welding device comprising:
   a pair of pressure members opposing each other for pressurizing the web and the continuous strip member;
   a feed device configured to intermittently or continuously feed the web and the continuous strip member in a longitudinal direction of the web and the continuous strip member through the pair of pressure members in a state in which the web and the continuous strip member are superposed on each other; and
   a laser device configured to irradiate the web or the continuous strip member with a laser beam at a position upstream of the pair of pressure members so as to melt the web or the continuous strip member with the laser beam for welding of the web and the continuous strip member,
   the feed device being further configured to pause or stop the web and the continuous strip member after retracting the web and the continuous strip member by a certain length so as to weld the web and the continuous strip member to each other.

6. The welding device of claim 5, wherein the pair of pressure members is a pair of pressure rollers.

7. A welding method for welding a web and a continuous strip member to each other, the welding method comprising:
   intermittently feeding the web and the continuous strip member in a longitudinal direction of the web and the continuous strip member through a pair of pressure members in a state in which the web and the continuous strip member are superposed on each other;
   irradiating the web or the continuous strip member with a laser beam at a position upstream of the pair of pressure members to melt the web or the continuous strip member with the laser beam for welding of the web and the continuous strip member; and
   during a pause phase of an intermittent feed cycle, moving the pair of pressure members upstream from a reference position with respect to the web and the continuous strip member such that the web and the continuous strip member are pressurized by the moving pair of pressure members to be welded to each other and moving the pair of pressure members back to the reference position.

8. The welding method of claim 7, wherein the web is a continuous sheet panel for bags, and the strip member is a continuous zipper for the bags.

* * * * *